Dec. 10, 1957 A. J. FAUCHER 2,815,888
COOKING APPARATUS
Filed Oct. 1, 1953 2 Sheets-Sheet 2
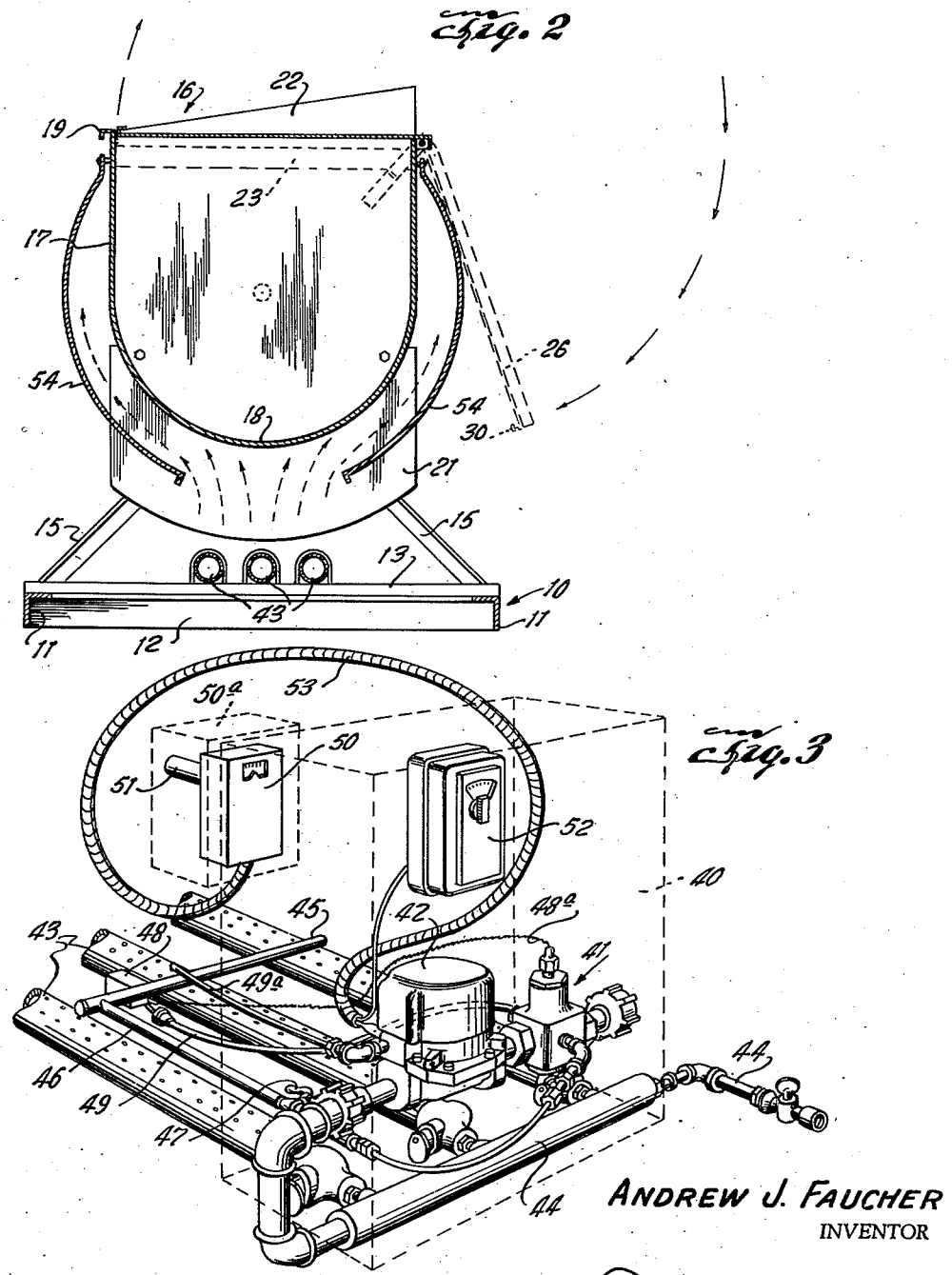
ANDREW J. FAUCHER
INVENTOR
ATTORNEY

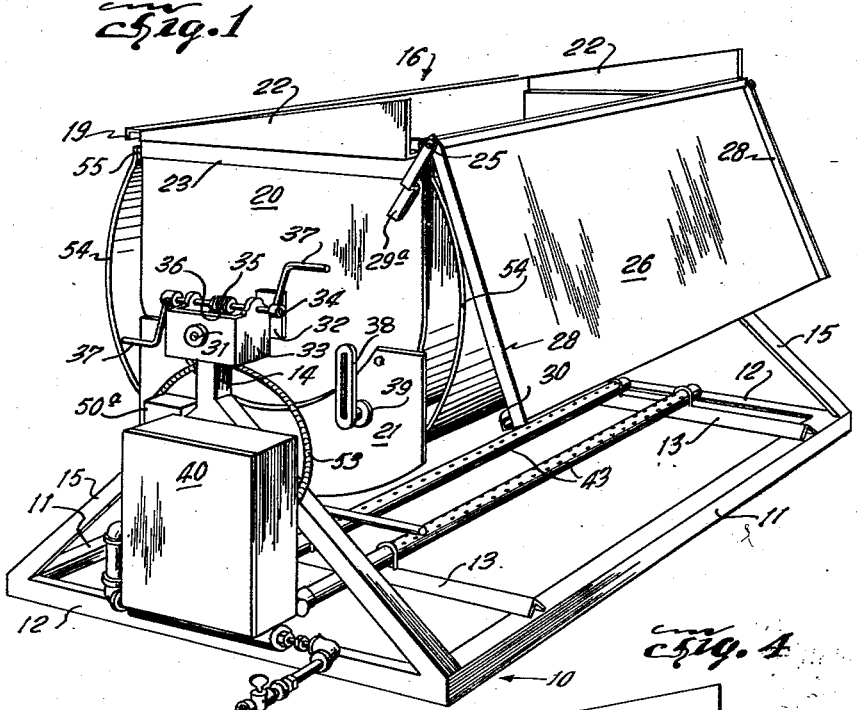
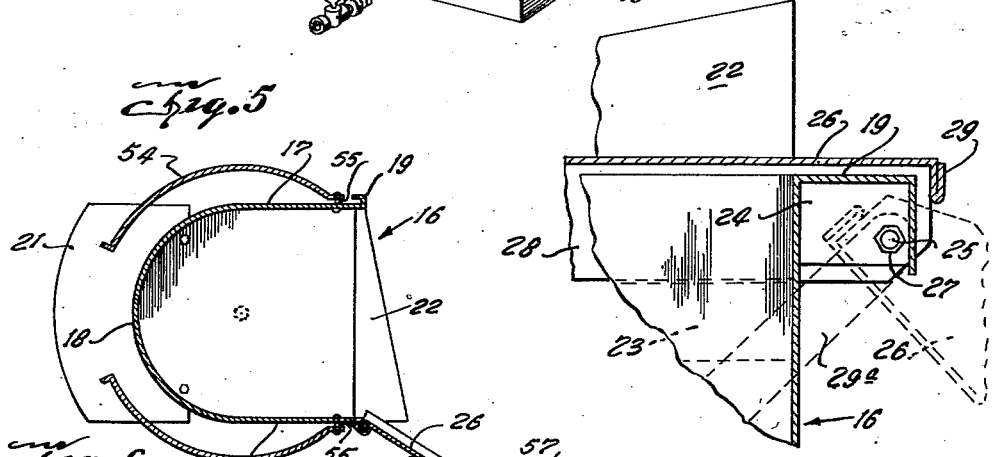
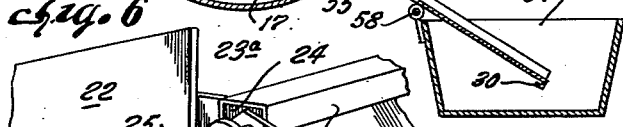

United States Patent Office 2,815,888
Patented Dec. 10, 1957

2,815,888
COOKING APPARATUS

Andrew J. Faucher, Arlington, Tex.

Application October 1, 1953, Serial No. 383,502

3 Claims. (Cl. 222—166)

This invention relates to cooking vats and has reference to apparatus for raising the temperature of kitchen refuse before feeding the same to pigs. Some States now require such cooking for the purpose of preventing or decreasing disease among the fed animals. By way of example, the State of Texas requires that such refuse shall be cooked for at least thirty minutes at 212° Fahrenheit before feeding.

An object of the invention is to provide apparatus for conveniently and easily cooking and handling relatively large quantities of kitchen refuse.

Another object of the invention is to provide apparatus for the described purpose which will not spill when emptying the contents of the cooking vat into a feed trough.

Another object of the invention is to provide a cover construction for tiltable cooking apparatus, and which cover additionally provides a discharge chute when emptying the cooking vat.

Another object of the invention is to provide an automatic cooker for the described purpose, and one which may be set for raising the temperature of the refuse and maintaining the same for desired lengths of time, after which the heat is automatically cut off, thus requiring a minimum of attention during the cooking operation.

A further object is to provide a tiltable cooking vat construction which does not require packing at the trunnions.

These and other objects will become apparent from the following description and accompanying drawings, wherein:

Figure 1 is a perspective view of a kitchen refuse cooking vat embodying the features of the invention.

Figure 2 is a transverse vertical sectional view of the apparatus shown in Figure 1.

Figure 3 is a fragmentary perspective view showing the automatic burner arrangement.

Figure 4 is an enlarged transverse sectional view of the side of the vat and the hinged cover.

Figure 5 is a transverse sectional view of the cooking vat and showing the same in its tilted position for emptying the contents into a feed trough, and Figure 6 is a fragmentary perspective view of the hinge arrangement shown in Figure 4.

The form of the invention shown includes a rectangular base 10 of angle iron and includes sides 11, cross members 12, and transversely arranged burner supports 13. Vertical supports 14 are secured on the end members 12 and are held in place by braces 15. Preferably, the described frame construction 10 is welded, but other suitable securing means may be employed.

A primary feature of the invention has to do with a tiltable vat 16 having spaced parallel sides 17, a semicircular bottom 18 and outwardly and downwardly formed edges 19 along the upper portions of the sides. The last referred to formed edges are the equivalent of channel sections for lending strength and rigidity to the vat construction. The end plates 20 of the vat have depending skirts 21 which, as will become apparent, have to do with reducing heat loss during the cooking operation.

Triangular shields 22 are formed with inwardly disposed lower edges 23 which are welded or otherwise affixed to the end plates 20 of the vat below the upper edges thereof, thus to provide a channel 23a (Figure 6), paralleling these upper edges and which will be again referred to presently. Within each end of the adjacent channel structure 19 there is a transverse plate 24 for supporting a pivot pin 25 on which a flat rectangular cover 26 is hinged. As shown in Figure 4, the pins 25 may be in the form of bolts and secured in place by means of nuts 27. The cover structure, as viewed in its closed position, has end flanges 28 through which the pivot pins 25 are positioned and an adjacent flange 29 along the adjacent side of the cover. The hinge pins extend outwardly from each end of the cover 26 and enter apertures in the upper ends of angular supports 29a, the lower ends of the supports being welded to the end plates 20 of the vat. This arrangement enables the ends of the cover to extend outward to coincide with the triangular shields 22, thus to prevent spilling of the contents of the vat when the cover is rotated into a position to be used as a chute for emptying the vat, as illustrated in Figure 5. As shown in Figures 1, 2 and 5, the free end of the cover or chute 26, as the case may be, has its reinforcing flange 30 formed upwardly as viewed when the cover is closed, for facilitating the discharge of the vat contents.

The outer surfaces of the end plates 20 are provided with trunnions 31 mounted in bearings, not shown, on the upper ends of the vertical supports 14, and which trunnions are provided with integral flanges 32 on their inner ends. The flanges 32 are bolted or welded to the end plates 20. One of the vertical supports 14 is provided with a box like bearing support 33 having a shaft 34 rotatably mounted therein, together with a worm 35 mounted thereon for engagement with a gear 36 secured on the trunnion 31. Hand cranks 37 are mounted on the outer ends of the shaft 34, and which described gear construction provides for convenient and easy emptying of the vat 16. A thermometer 38 is positioned in well 39 extending into the vat 16, and which thermometer is mounted on one depending skirt 21 for determining the temperature of the refuse being cooked.

A box 40 attached to one of the vertical supports 14 encloses an automatic burner regulator, illustrated in Figure 3. Since the automatic regulator arrangement is conventional, the same is not herein described in detail. However, the exemplary regulator shown includes an automatic safety control 41, a main control valve 42, and a series of main burners 43, all connected with a manifold with which communicates a fuel supply line 44. A manual pilot 45 is arranged for lighting the main burners 43, and is connected with the automatic safety control 41 by means of a pipe 46 having a manual control valve 47 connected with the latter. A conventional automatic pilot 48 is mounted near the openings of the manual pilot 45 and is connected with the automatic safety control 41 by means of a small connecting line 49. The automatic pilot generates a small amount of electrical current which is supplied to the safety control valve 41 through wire 48a and is effective to close the valve should the flame of the manual pilot 45 be extinguished.

A small pipe 49a extends from the main control valve 42 to and overlies the manual pilot 45 to convey a small amount of fuel which remains ignited at all times to burn any fuel which may enter the pilot 45 while the control valves are closed. As shown in Figure 3, an aquastat 50 is mounted in a box 50a on one of the vat end plates 20 and extends into a well 51 within the vat 16. The aquastat 50 is electrically connected in series with the main control valve 42 for regulating the main burners 43. The aquastat referred to may be set to operate within a selected range of temperatures. Additionally, the electrical timer 52 is electrically connected with the main control valve 42 for controlling the duration of the cooking operation. It will also be noted that the coil of wire 53, shown in Figure 3, provides for expansible electrical connection between the movable thermostat and the stationary main control valve 42.

The parallel main burners 43 are supported on the previously described cross supports 13, and both are beneath the lower semi-circular vat bottom 18. Arcuate hoods or baffle plates 54 are mounted on opposite outer surfaces of the vat 16 and are spaced from each other along their lower edges so as to direct the heat upwardly around the vat sides 17. The lower ends of the hoods 54 are secured to the inner surfaces of the depending skirts 21 of the vat end plates 20, whereas the upper ends of the hoods are secured to and spaced from the upper portions of the side walls 17 by means of tubular spacers 55 having bolts therethrough.

In operation, the refuse to be cooked is placed in the upright vat 16, the cover 26 is then closed, and the main burners 43 are lighted in the usual manner. The aquastat 50 is set for the desired temperature, and the timer 52 is set for the desired time during which the refuse is to be cooked. During the cooking operation, the skirts 21 of the end plates 20 are effective to more or less confine the heat of the burners to the areas to be heated and protect to a degree the control mechanism. After the cooking operation is completed, and at which time the main burners have gone out, the cover 26 is hingedly opened, in the manner as shown by dotted lines in Figure 2, and the outer surface of the cover is placed on the edge of a trough 57, as shown in Figure 5, and the vat is tilted by turning the hand cranks 37. Rollers 58 may be provided on the side of the trough 57 for supporting the cover 26 and reducing friction. During the tilting and refuse emptying operation, it will be noted that the shields 22 guide the cooked material onto the opened cover 26 where the end flanges 28 guide the same into the trough 57. After cleaning, the described apparatus is again ready for use.

It is not intended that the invention be limited to the particular type of fuel regulating and controlling means shown and described as it may be necessary in cooking great quantities of refuse to employ equipment and control mechanisms for heating mediums other than fuel gas, such as steam, in which event the elements of the claimed invention would remain unchanged but the method and means for applying heat would likely be changed to meet various conditions and requirements.

Manifestly, the construction as shown and described is capable of some modification and such modification as may be construed to fall within the scope and meaning of the appended claims is also considered to be within the spirit and intent of the invention.

What is claimed is:

1. A kitchen refuse cooker or the like comprising a vat having trunnions on opposite ends thereof a frame having vertical supports carrying bearings in which said trunnions are journaled and on which said vat revolves about a horizontal axis, a cover hingedly secured to one side of said vat and arranged to extend downwardly and outwardly of said vat when in its opened position, a triangular shield across and extending above each end of said vat, said shields having vertical ends adjacent the sides of said vat to which said cover is hingedly connected and means for tilting said vat on an axis about its said trunnions.

2. A kitchen refuse cooker or the like comprising a vat including straight parallel sides along the upper edges thereof, at least one of said edges being flanged, end plates secured to said sides, trunnions extending outwardly from said end plates, a supporting frame having a vertical member at each end thereof, each supporting one of said trunions to define a horizontal axis about which said vat is rotatable, a shaft on one of said vertical members, a cover of greater length than said vat and hingedly secured to said vat on the side thereof including said flanged edge, a projecting flange on the side of said cover adjacent said flanged edge of said vat and arranged to move around the latter when said cover is opened, to form a chute, flanges on the ends of said cover and arranged to be upwardly positioned when said cover is opened and a shield affixed to and extending upward from each end of said vat and defining a channel for the reception of the flanges of said cover in closed position thereof, and effective in tilted position of said vat to guide material from said vat on to said cover and means carried by each end of said shaft for rotating the same to tilt said vat.

3. A cooking apparatus comprising an elongate supporting frame having uprights, a vat supported between said uprights for tilting displacement on said frame, a flanged cover hinged at one longitudinal edge to a longitudinal edge of said vat adapted in one position to close said vat and in another position to transfer the contents of said vat in tilted position of the latter, an upstanding shield attached to and spaced from each of said vat, said shields defining channels paralleling said vat ends to receive the flanges of said cover in closed position thereof, and means for tilting said vat.

References Cited in the file of this patent

UNITED STATES PATENTS

| | | |
|---|---|---|
| 2,036,115 | Branch | Mar. 31, 1936 |
| 2,283,256 | Husk | May 19, 1942 |
| 2,630,941 | Cappellini | Mar. 10, 1953 |

FOREIGN PATENTS

| | | |
|---|---|---|
| 129,237 | Switzerland | Oct. 3, 1927 |
| 235,966 | Switzerland | Jan. 15, 1945 |